United States Patent [19]

Faber et al.

[11] Patent Number: 5,093,393
[45] Date of Patent: Mar. 3, 1992

[54] STARCH-BASED CORRUGATING ADHESIVE HAVING A POLYVINYL ALCOHOL COMPONENT

[75] Inventors: John A. Faber, White Bear Lake; Paul L. Krankkala, Hudson, both of Wis.

[73] Assignee: H. B. Fuller Company, St. Paul, Minn.

[21] Appl. No.: 310,227

[22] Filed: Feb. 13, 1989

[51] Int. Cl.$^5$ .......................... C08L 3/04; B31F 1/20; B32B 23/08; C09J 101/00
[52] U.S. Cl. .......................... 524/30; 524/47; 524/52; 524/53; 156/208; 156/210; 156/328; 156/332; 428/511
[58] Field of Search .......................... 524/52, 53, 47, 30; 156/332, 328, 208, 210; 428/511

[56] References Cited

U.S. PATENT DOCUMENTS

| | | | |
|---|---|---|---|
| 2,102,937 | 12/1937 | Bauer | 134/23.4 |
| 2,529,851 | 11/1950 | Scrutchfield | 524/47 |
| 3,112,235 | 11/1963 | Blanchard | 156/310 |
| 3,135,648 | 6/1964 | Hawkins | 161/249 |
| 3,371,004 | 2/1968 | Kennedy | 156/321 |
| 3,498,869 | 3/1970 | Murakami et al. | 156/328 |
| 3,591,534 | 7/1971 | Dunholter | 524/47 |
| 3,720,633 | 3/1973 | Nickerson | 524/48 |
| 3,728,141 | 4/1973 | Ray-Chaudhuri et al. | 524/47 |
| 3,941,730 | 11/1976 | Solenberger | 524/45 |
| 4,008,116 | 2/1977 | Sebel | 156/328 |
| 4,018,959 | 4/1977 | Demko et al. | 428/182 |
| 4,094,718 | 6/1978 | Czerwin | 156/210 |
| 4,131,581 | 12/1978 | Coker | 524/141 |
| 4,192,783 | 3/1980 | Bomball et al. | 524/21 |
| 4,240,841 | 12/1980 | DiDominicis | 106/211 |
| 4,251,400 | 2/1981 | Columbus | 524/24 |
| 4,272,295 | 6/1981 | Linke | 106/157 |
| 4,297,144 | 10/1981 | Klein et al. | 106/197 |
| 4,350,788 | 9/1982 | Shimokawa et al. | 524/309 |
| 4,359,341 | 11/1982 | Allen | 106/213 |
| 4,374,217 | 2/1983 | Miyake et al. | 524/47 |
| 4,442,252 | 4/1984 | Sumi et al. | 524/183 |
| 4,444,839 | 4/1984 | Dudzik et al. | 428/336 |
| 4,521,561 | 6/1985 | Hausman et al. | 524/459 |
| 4,542,178 | 9/1985 | Zimmermann et al. | 524/388 |
| 4,600,739 | 7/1986 | Krankkala | 524/48 |
| 4,674,698 | 6/1987 | Krankkala | 524/47 |
| 4,814,039 | 3/1989 | Willging | 524/592 |
| 4,826,719 | 5/1989 | Murdock et al. | 428/182 |

FOREIGN PATENT DOCUMENTS

| | | |
|---|---|---|
| 13818/83 | 4/1982 | Australia. |
| 1068025 | 12/1979 | Canada. |
| 0239421 | 9/1987 | European Pat. Off.. |
| 0253642 | 1/1988 | European Pat. Off.. |
| 45-19600 | 7/1970 | Japan. |
| 1514630 | 6/1978 | United Kingdom. |

OTHER PUBLICATIONS

Air Products Technical Bulletin, VINOL® Polyvinyl Alcohols.
Air Products Material Safety Data Sheet.
*Preparation of Corrugating Adhesives,* Chap. 5, pp. 38-46.
Kirk-Othmer, *Encyclopedia of Chemical Technology,* vol. 22, pp. 156-173, Chapter entitled "Waxes".
"Viscosity-Increasing Agent of Polyvinyl Alcohol in Aqueous Solution", by Takuhiko Motoyama and Seizo Okamura.

*Primary Examiner*—John Kight, III
*Assistant Examiner*—P. Hampton-Hightower
*Attorney, Agent, or Firm*—Merchant, Gould, Smith, Edell, Welter & Schmidt

[57] ABSTRACT

A starch-based corrugating adhesive providing a controlled rate of viscosity increase and green bond formation comprising water, starch, caustic alkali, an active boron source, and polyvinyl alcohol having an intermediate degree of hydrolysis (about 92% to 98%), wherein the polyvinyl alcohol constituent imparts a definite increase in the rate of viscosity building of the adhesive, the rate of viscosity increase being controlled to provide an effective green bond and final adhesive bond on a corrugated board surface.

25 Claims, No Drawings

STARCH-BASED CORRUGATING ADHESIVE HAVING A POLYVINYL ALCOHOL COMPONENT

FIELD OF THE INVENTION

The invention relates to a starch based adhesive composition that can be used to form corrugated board. More particularly this invention relates to a starch based adhesive containing a selected polyvinyl alcohol with a certain degree of hydrolysis which provides high quality, fast-setting but cost efficient bonding.

BACKGROUND OF THE INVENTION

The adhesives which have been developed to form the corrugated board or paper board are generally starch base adhesives. The earliest corrugating board adhesive patent, U.S. Pat. No. 2,102,937, discloses an adhesive composition comprising gelatinized starch, ungelatinized starch, alkali and borax in a water base. This adhesive has formed the basis for the manufacture of essentially all corrugated paper board to date. This adhesive is a carrier adhesive, wherein a portion of the starch forms a carrier gelatinized phase and the balance of the starch forms an ungelatinized phase. Under conditions of heat and pressure the ungelatinized starch rapidly gelatinizes, absorbs water and causes a rapid increase in viscosity and adhesion of the starch-adhesive composition. Borax also increases the level of viscosity during final gelatinization.

Corrugated paper board or liner board is commonly prepared by first forming a corrugated element. This element is produced by passing a cellulosic sheet between corrugating rolls to form a substantially sinusoidal or serpentine cross-section in the sheet. A starch-based adhesive is commonly applied to the tips of the thus formed sinusoidal portion called flutes. A non-corrugated or planar cellulosic liner is applied against the adhesive coated flutes of the corrugated elements as the corrugated sheet passes between a corrugating roll and a pressure roll. The resulting paper product having the corrugating medium on one side and the planar liner on another side is called a single-faced element.

The single-faced element may be used in certain applications as a liner or buffer material within a container. More commonly, adhesive is applied to the flute tips of the single-faced element and a second liner sheet is subsequently applied to the adhesive liner in a "double facer" operation. The second liner sheet is exposed to conditions of heat and pressure during its contact with the adhesive. In a so-called "hot-plate" dryer section, a continuously moving belt with a hot-plate or platen surface is used to partially remove water from the adhesive bond line and establish a cured adhesive bond at temperatures of about 300°-400° F.

More recently a number of patents have disclosed a corrugating board adhesive that can be characterized as a conventional starch-based adhesive containing finely divided solid particles of a substantially room temperature insoluble polyvinyl alcohol. The water insoluble polyvinyl alcohol disclosed in these patents becomes soluble at the elevated temperature in a corrugating moisture. A substantially insoluble polyvinyl alcohol is used in these patents since the common belief of the corrugating industry as set forth in Czerwin, U.S. Pat. No. 4,094,718, is that soluble polyvinyl alcohol will gel in the presence of borax containing starch based adhesives. Insoluble polyvinyl alcohol permits the use of the polyvinyl alcohol in starch based adhesives since in storage at ambient temperatures the polyvinyl alcohol, in solid form, cannot interact with starch or borax.

The speed at which corrugating machines can be run is limited by the rate of viscosity increase in the bond line between the liner and corrugated medium. As the viscosity of the adhesive rises under conditions of heat and pressure in the corrugating machine, a "green bond" is formed which holds the components together until the adhesive system forms the final heat-cured corrugated bond.

Research has shown that the use of fully hydrolyzed, insoluble polyvinyl alcohol in a starch based adhesive provides a viscosity increase which is reliant on the rate of solubilization of the highly divided polyvinyl alcohol under the appropriate process conditions. Once the polyvinyl alcohol is in solution, it promotes the requisite increase in adhesive viscosity. Further, the use of other polyvinyl alcohols in corrugating adhesives is shown in Krankkala, U.S. Pat. Nos. 4,600,739, 4,673,698 and 4,677,145.

BRIEF DESCRIPTION OF THE INVENTION

We have found that the economics of use, the compatibility and green bond formation in starch-based corrugating adhesive can be improved through the use of a controlled amount of polyvinyl alcohol having an intermediate degree of hydrolysis in a corrugating adhesive comprising starch, alkali base, boric acid, and water.

DETAILED DESCRIPTION OF THE INVENTION

Briefly, the novel corrugated board adhesives of this invention are prepared by forming an aqueous alkaline emulsion, containing polyvinyl alcohol with an intermediate degree of hydrolysis, starch, a strong alkali metal hydroxide base and a boric acid compound and optionally a crosslinking resin reactive in an alkaline environment for a water resistant adhesive, and wax.

A portion of the starch in the adhesive forms a suspending paste or medium for the adhesive ingredients. The adhesive suspending paste or medium must be sufficiently viscous to maintain a smooth suspension of the non-gelled starch particles, but not so viscous as to interfere with the application of the adhesive to the paper board. The nature and proportion of dissolved solids in the carrier medium influences both pot life and the speed with which a given paper stock absorbs water from the applied adhesive. The water content of the adhesive effects adhesive properties. A small degree of water absorption from the adhesive to the paper is desirable in forming strong bonds between the paper elements. Absorption of water beyond that required to give good bonding is undesirable since it robs the adhesive of water needed to complete the gelatinization of the suspended starch upon heating in the corrugator and leads to inferior bonding.

Our extensive research has shown that viscosity increase and, in turn, green bond formation in starch based corrugating adhesives is dependent upon two factors. First, the attainment of increased viscosity is dependent upon the rate of polyvinyl alcohol dissolution into the adhesive formulation. This solution of the polyvinyl alcohol into the aqueous starch based adhesive composition is further dependent upon a number of factors including the molecular weight of the polyvinyl alcohol, and the degree of hydrolysis carried by the polyvinyl alcohol composition, amongst other factors.

Additionally, the attainment of an increased rate of viscosity build up is dependent upon the rate of reaction between the polyvinyl alcohol and the boron constituent present in the starch based adhesive. To attain a normal rate of reaction between polyvinyl alcohol and the boron constituent it is important that the polyvinyl alcohol constituent be dispersed uniformly prior to its dissolution. Once dissolved, the polyvinyl alcohol is present in a concentration necessary to react with the available boron constituent present in the adhesive composition.

Given these broad considerations which are further complicated by the adhesive viscosity stability and phase change, and to processing parameters present in the environment of use, designing an adhesive formulation which will react properly in any given plant environment becomes a fairly complex matter. However, we have discovered that the proper attenuation of these factors provides an adhesive composition which may be formulated to suit variable needs. Of principle importance within this adhesive formulation is the use of a polyvinyl alcohol constituent having an intermediate degree of hydrolysis and a specific molecular weight. More specifically, the introduction of a polyvinyl alcohol constituent having an intermediate degree of hydrolysis into a starch based corrugating adhesive provides a controlled rate of viscosity increase which is dependent upon the molecular weight and concentration of polyvinyl alcohol present in the adhesive composition.

The present composition provides for the use of a polyvinyl alcohol premix composition in a two tank carrier process. Alternatively, the starch based polyvinyl alcohol composition of the present invention has a versatility to allow mixing in a single tank carrier process or a no carrier process. The use of a polyvinyl alcohol having an intermediate degree of hydrolysis combined with the higher molecular weight provides an adhesive which builds viscosity at a controlled and definite rate.

Polyvinyl Alcohol

Polyvinyl alcohol (PVOH), a polyhydroxy polymer having a polyethylene backbone with pendent hydroxy groups, is a water soluble synthetic resin, which is produced by the hydrolysis of polyvinyl acetate. The theoretical monomer:

does not exist. Polyvinyl alcohol is one of the very few high molecular weight commercial polymers that can be water soluble. It is commonly available as a dry solid and is available in granular or powdered form. Grades of polyvinyl alcohol include a "super" hydrolyzed form (99.3%+removal of the acetate groups), a fully hydrolyzed form (99%+removal of the acetate groups), a form having an intermediate degree of hydrolysis (about 91% to 98% removal of acetate group), a partially hydrolyzed form (about 85% to 91% removal of the acetate groups), and a low hydrolyzed form (less than 85% removal of the acetate groups).

The properties of the resins vary according to the molecular weight of the parent polymer and the degree of hydrolysis. Polyvinyl alcohols are commonly produced in nominal number average molecular weights that range from about 20,000 to 100,000. Commonly the molecular weight of the various commercial polyvinyl alcohol grades is reflected in the viscosity of a 4 wt-% solution measured in centipoise (cP) at 20° C. with a Brookfield viscometer. The viscosity of a 4% solution can range from about 5 to about 65 cP.

Polyvinyl alcohol is made by first forming polyvinyl acetate or a vinyl acetate containing copolymers such as ethylene vinyl acetate copolymers and removing the acetate groups using a base catalyzed alkanolysis. The production of polyvinyl acetate or a vinyl acetate copolymer can be done by conventional processes which controls the ultimate molecular weight. Catalyst selection temperatures, solvent selection and chain transfer agents can be used by persons skilled in the art to control molecular weight. The degree of hydrolysis is controlled by preventing the completion of the alkanolysis reaction. Polyvinyl alcohol is made in the United States by Air Products & Chemicals, Inc. under the tradename AIRVOL TM, and by E. I. duPont de Nemours under the tradename ELVANOL TM Solutions of polyvinyl alcohol in water can be made with lower alcoholic cosolvents and salt cosolutes. Polyvinyl alcohols can react with aldehydes to form acetals, can be reacted with acrylonitrile to form cyanoethyl groups, and can be reacted with ethylene or propylene oxide to form hydroxy alkylene groups. Polyvinyl alcohols can be readily crosslinked and can be borated to effect gelation.

The preferred polyvinyl alcohol compositions for use in this invention comprise polyvinyl alcohol made from a homopolymer or interpolymer of vinyl acetate having an intermediate degree of hydrolysis, i.e. between about 92% and 98% of the hydroxyl groups are acetate free. The preferred polyvinyl alcohol is available in low or medium molecular weight variations characterized by the Brookfield viscosity of a 4 wt-% aqueous solution at 20° C. The low molecular weight polyvinyl alcohol having an intermediate degree of hydrolysis has a viscosity of less than about 20 cP, and the medium molecular weight composition has a viscosity of about 20–40 cP. The most preferred viscosity is less than 30 cP.

The most preferred polyvinyl alcohol composition is made from a low or medium molecular weight homopolymer of vinyl acetate having an intermediate degree of hydrolysis resulting in the removal of about 92% to 98% of the acetate groups from the vinyl acetate homopolymer. As will be seen further, polyvinyl alcohol having an intermediate degree of hydrolysis provide an adhesive composition which bonds with equivalent or greater strength than adhesive composition using partially hydrolyzed polyvinyl alcohol at far greater concentrations. Moreover, in addition to the ability of the adhesive containing polyvinyl alcohol, having an intermediate degree of hydrolysis, to provide a superior adhesive bond with far less alcohol, this adhesive has a viscosity profile which is storage stable and mirrors that of starch based adhesives containing partially hydrolyzed polyvinyl alcohol.

Starch

The starch-based adhesives of this invention are commonly characterized as being either a carrier- adhesive, a no carrier adhesive, or a carrier/no carrier adhesive. The term carrier adhesive implies the presence of a thin base of gelatinized starch in which ungelatinized or nonhydrated starch particles are emulsified or suspended. The term no carrier adhesive implies the substantial absence of gelatinized or hydrated starch in the adhesive emulsion. The term carrier/no carrier adhesive implies that the distinction between gelatinized starch and ungelatinized starch is not clear in the adhesive composition. Generally carrier/no carrier adhesives are prepared in a way that a substantial amount of partly hydrated or partly gelatinized starch is formed. These terms are imprecise since during the preparation of the starch-based adhesives some starch inherently becomes gelatinized during processing at any temperature. However, substantial proportions of starch remain ungelatinized and nonhydrated during preparation. This starch generally gelatinizes and interacts with PVOH and boric acid compounds during green bond formation.

The starch used in both the carrier phase and suspended starch phase is a commodity chemical produced from a number of root, stem or fruit, plant sources. Starch is a high molecular weight polymeric carbohydrate polysaccharide, most commonly composed of six carbon monosaccharide units joined by alpha-glycan linkages having an approximate molecular formula of $(C_6H_{10}O_5)_n$, wherein n equals $10^2$ to $10^6$ Starch occurs naturally in the form of white granules and comprises linear and branched polysaccharide polymers. Starch is commonly manufactured by first soaking and grinding the plant starch source, and separating the starch from waste matter. The starch is commonly reslurried and processed into a finished dried starch product. Commercial starch often has the form of a pearl starch, powdered starch, high amylose starch, precooked or gelatinized starch, etc. Preferably pearl starch is used in making both the carrier phase and the particulate starch suspended in the carrier.

Base

The novel adhesive compositions of the invention contain a strong base which promotes the production of crosslinking species from the resin and acts to cure the adhesive. Essentially any strong base can be used, however preferred bases are alkali metal hydroxides. The most preferred strong bases include sodium and potassium hydroxide. The strong base also lowers the gel point of the starch, which increases the rate of hydration of the starch during curing of the glue line. The pH of the adhesive composition commonly ranges from about 9 to 13 and preferably from about 11 to 12. In order to obtain a pH within these ranges an amount of base, preferably sodium hydroxide. is used which falls between about 0.02 and 0.75 parts of sodium hydroxide per each 100 parts of the aqueous adhesive composition.

Boric Acid Compound

The novel adhesive compositions of the invention include boric acid compound which cooperates with the gelatinized and nongelatinized starch during heating and curing. The boric acid reacts with available hydroxyl groups of the starch, forming a starch borax complex which aids in gelling the carrier starch molecules and the suspended starch molecules. The cooperative reaction increases the tack of the adhesive and produces strong bonds. Any boric acid compound having free hydroxyl groups attached to the boron atom can be used, however commercial boric acid (orthoboric acid, $H_3BO_3$ and its hydrated forms $H_3BO_3 \cdot XH_2O$, X being from about 3 to 12) and borax (sodium tetraborate decahydrate, $Na_2B_4O_7 \cdot XH_2O$, X being from about 3 to 12) and other hydrate and anhydrous forms are commonly used. For a discussion of boric acid compounds such as boron oxides, boric acids and borates, see Kirk-Othmer Encyclopedia of Chemical Technology, 2nd Edition, Vol. 3, pp. 608–652.

The boric acid compound increases the tackiness, viscosity, and cohesive strength of the adhesive. As the adhesive cures in the glue line, a gel structure forms between the hydroxyl group of the polysaccharide, the basic acid compound and the PVOH. Further, the borax buffers the caustic nature of the base used in the adhesive thereby stabilizing the adhesive to the hydrolytic effect of the base.

Crosslinking Resins

Resins that can be used in the novel adhesive compositions of this invention include resins that upon heating in basic media generate crosslinking species that react with and crosslink the hydroxyls in adjacent starch molecules. The crosslinking reagent tends to reduce the hydrophilic nature and the water solubility of the starch molecules by effectively reducing the concentration of hydroxyl groups available to water. Also, the crosslinking reagents introduce aliphatic alkylene-type crosslinking moieties.

A preferred class of crosslinking resins comprise well known condensation products of the reaction of a ketone and an aldehyde compound. These resins are characterized as a polyether oligomer or polymer but can contain a variety of other monomers such as urea, melamine, etc. In the presence of heat and base, they commonly decompose to produce species that effectively crosslink the starch molecules. Preferred resins are acetone-formaldehyde resins, acetone-urea-formaldehyde resins, acetonemelamine-formaldehyde resins comprising 15 to 30 wt-% acetone, about 5 to 50 wt-% formaldehyde and 0 to 15 wt-% of a third monomer. One example of the preferred crosslinking resin embodiment of this invention comprises the FULLREZ TM series of resins manufactured by H. B. Fuller Company or Ketack series of resins manufactured by American Cyanamide.

Wax

The term wax is used very broadly and applies to a wide variety of materials. The materials can have properties resembling certain well known waxes or can be used to provide physical properties similar to those associated with well known properties of wax such as sealing, polishing, candle making, etc. Many waxy substances have been found in nature and have been known to be useful for many years.

Historically waxes include substances that are natural products. Chemically natural waxes are esters of fatty acids and monohydric fatty alcohols. Physically waxes are water repellant solids having a useful degree of plastic character. However, modern waxes include various synthetic substances that can replace natural waxes in many preparations. The composition of natural waxes generally comprise an ester of a saturated fatty acid and a long chain monohydric alcohol. Long chain fatty acids often include acids having greater than 16 carbon atoms and most commonly about 26 carbon atoms. The aliphatic monohydric alcohol commonly has at least 14 and can range as high as 36 carbon atoms. Petroleum, mineral or other synthetic waxes often consist of saturated hydrocarbons having aliphatic or open chain structures with relatively low branching or side chains.

Particularly preferable waxes for the water resistant corrugated board adhesive are waxes such as petroleum waxes, candelilla wax, beeswax, etc. Particularly preferred waxes are the petroleum waxes such as microcrystalline waxes, slack waxes and paraffin waxes.

Wetting Agent

Optionally, the starch based adhesive of the present invention may also contain a wetting agent. The use of a wetting agent and the starch based adhesive of the present invention is especially appropriate whenever the substrate to be bonded is generally resistent to the penetration of the adhesive. Such resistance may result from the general nature of the substrates or from any variety of pretreatment processes which are used in the fabrication of corrugated boards. Moreover, a wetting agent may be used to provide an adhesive composition which has increased penetration abilities under conditions of high heat transfer. In such instances, a starch based adhesive without a wetting agent may set up and bond prematurely prior to the penetration of the adhesive into the corrugated board.

In order to ensure penetration of the corrugated board by the adhesive, a wetting agent may be incorporated into the adhesive composition of the present invention. Generally, any wetting agent which will impart the chemical characteristics of increased absorbency and increased surface activity to the adhesive composition of the present invention may be used. For example, wetting agents such as surfactants and more specifically nonionic surfactants, such as ethylene oxide/propylene oxide copolymers, ethoxylated alkylphenol and ethoxylated fatty alcohols may be used.

In somewhat greater detail, the novel fast set corrugating adhesives of this invention can be made by combining the ingredients in water and heating the mixture until a smooth uniform composition is formed. In a "no carrier" system, the adhesive is made by combining a starch slurry with a solution of the, base in water, heating the mixture to partially gelatinized the starch and then adding the remaining components under conditions of mixing to form the smooth corrugated board adhesive. The adhesive can contain from about 15 to 40 parts of starch and about 0.02 to 0.75 parts of base per 100 parts of the adhesive composition. In "carrier" adhesives, the carrier phase comprises about 1.5 to 4.0 parts of starch and the ungelatinized phase comprises 14 to 38 parts of starch per each 100 parts of adhesive. The "no carrier" adhesive can contain about 15 to 20 parts of boric acid per each 100 parts of adhesive and optionally about 0.5 to 2.0 parts of alkaline reacting crosslinking resin per 100 parts of adhesive and about 0 to 5 parts of wax in an emulsion form per each 100 parts of adhesive.

The fast setting adhesive of this invention contain about 0.05 to 0.6 parts of polyvinyl alcohol per each 100 parts of adhesive. Preferably the adhesive contains about 0.05 to 0.3 parts of polyvinyl alcohol and most preferably for reasons of rapid set and compatibility with the adhesive components about 0.075 to 0.3 parts of polyvinyl alcohol per 100 parts of adhesive. Optionally, wetting agents may be used in the starch based adhesive composition of the present invention to impart characteristics of increased surface tension and increased absorbency in a concentration of from about 0.01 wt-% to 1.0 wt-% and more preferably for reasons of increased absorbency from about 0.02 wt-% to 0.5 wt-% and most preferably from about 0.02 wt-% to 0.3 wt-% of the total adhesive composition.

The composition is also capable of being produced in an aqueous based concentrate form which is added to a starch-based adhesive prior to use. Generally, the concentrate composition will comprise a major portion of water, about 2 parts to 30 parts of polyvinyl alcohol per 100 parts of concentrate, and about 0.05 parts to 2.0 parts of defoamer per 100 parts of concentrate. Generally, the upper concentration of polyvinyl alcohol in the concentrate is limited only by the ability to effectively disperse the PVOH in the starch-based adhesive composition. Optionally, the concentrate formulation may also contain water soluble fillers such as urea or corn syrup at a concentration ranging from about 0 parts to 10 parts of the concentrate composition.

Given various process limitations which can be found in any number of production environments in which corrugated board is manufactured, the adhesive composition of the present invention must be capable of performing in a variety of environments. As a result, the starch adhesive may be formulated first and then combined with the polyvinyl alcohol premix concentrate formulation immediately prior to application of the adhesive to the intended environment of use.

Working & Comparative Examples

Working examples and comparative examples were formulated to exhibit the difference in bond formation rates in starch based adhesives having a partially hydrolyzed polyvinyl alcohol constituent versus an adhesive having a polyvinyl alcohol constituent with an intermediate degree of hydrolysis such as that of the present invention.

Adhesive Base

A no-carrier adhesive base, being approximately 5,818 grams of starch based adhesive, was formulated for use in the examples through the following procedure. First, 3,336.0 grams of water was charged into a starch cooker, and the water was mixed at 58 rpm. Starch was slowly added to the mixing water until a total of 1582.4 grams of starch was introduced into the system. A caustic pre-mix was then added to the composition over 15 to 20 minutes.

The pre-mix comprised 832.0 grams of water and 48.0 grams of NaOH. The caustic pre-mix was added by way of a buret to regulate the concentration of caustic pre-mix introduced into the system as well as the time period over which the caustic pre-mix was added.

The starch based composition was then heated to 96° F. and the viscosity of the composition was monitored. After the viscosity reaches 17 to 20 number 5 Zahn cup seconds 20 grams of boric acid was quickly added to the system and the composition was mixed for an additional 20 minutes.

After this 20 minute period, the pH of the composition was 12.3. The viscosity of this composition using a number 5 Zahn cup was between about 9.4 and 9.6 seconds at 88° F. Finally, the gel temperature of the starch based composition was around 144° F.

Polyvinyl Alcohol Pre-Mixes

The starch adhesive base composition was split into 5 individual 1,000 gram samples. The comparative samples shown below were prepared through the addition of various concentrations of polyvinyl alcohol pre-mixes containing a polyvinyl alcohol constituent having different degrees of hydrolysis.

Generally, the pre-mixes were formulated by charging 55 wt-% of water into a mixing tank along with 1.0 wt-% of a defoamer. Five weight percent of a polyvinyl alcohol composition is then added to the mixture and direct steam is applied to the mixing vessel at 195° to 200° F. The composition was mixed at this temperature for 15 minutes at which point 5 wt-% of water was added to the system. The temperature was held at 195° to 200° F. for an additional 15 minutes and then cooled to 140° F. Cooling water was added at a quantity of 33.8 wt-% along with an antimicrobial agent which was added at 0.2 wt-%. Finally, the composition was weighed and the water lost through the heated mixing processes was added back to the composition to provide a total composition weight of 1000 grams for each premix.

Working Examples

Two working examples were formulated by adding a polyvinyl alcohol pre-mix to each 1,000 grams of the starch based adhesive. Provided below are the concentrations of the various constituents within the two working examples. The polyvinyl alcohol used in Working Examples 1 and 2 has an intermediate degree of hydrolysis with a 5% active concentration on the basis of the total premix weight.

|  | 1 | 2 |
|---|---|---|
| Starch Based Corrugating Adhesive | 1,000 grams | 1,000 grams |
| Polyvinyl Alcohol Pre-Mix | 30.4 grams (5% Active PVOH; 95.5–96.5% hydrolysis) | 30.4 grams (5% Active PVOH; 96.0–98.0% hydrolysis) |

Comparative Examples

Two additional comparative examples were then prepared from the remaining adhesive starch base. Generally, the polyvinyl alcohol premix used in Comparative Example B was formulated in accordance with the procedure used to formulate Working Examples 1 and 2. However, 18 wt-% of partially hydrolyzed polyvinyl alcohol was used, in combination with 1.0 wt-% defoamer and 0.2 wt-% antimicrobial. All other constituents remained the same in the premix. As can be seen in the table provided below, Comparative Examples A and B were prepared given the concentrations found in the table below.

|  | A (Control) | B |
|---|---|---|
| Starch Based Corrugating Adhesive | 1,000 grams | 1,000 grams |
| Polyvinyl Alcohol Based Pre-Mix | 30.4 grams H₂O (Control; 0% PVOH) | 7.6 grams (18% Active PVOH; 85%–91% hydrolysis) |

All the samples were blended at 2000 rpm for 10 minutes to fully fold the polyvinyl alcohol pre-mixes into the starch based adhesives. The initial viscosity of the starch based adhesive prior to the introduction of the polyvinyl alcohol premix was 11.8/12.0 at 82° F. using a number 5 Zahn cup viscometer.

TABLE I

| TIME FROM ADDITION OF PVOH PREMIX (sec.) | Viscosity (Zahn Cup Seconds @ °F.) | | | |
|---|---|---|---|---|
| | WORKING EXAMPLES | | COMPARATIVE EXAMPLES | |
| | 1 | 2 | A | B |
| Pre-PVOH* | 11.8/12.0 @ 82° F. | 11.8/12.0 @ 82° F. | 11.8/12.0 @ 82° F. | 11.8/12.0 @ 82° F. |
| Post-PVOH** | | | | |
| 0 | 8.2/8.4 @ 82° F. | 8.1/7.9 @ 82° F. | 8.4/8.6 @ 82° F. | 10.0/10.3 @ 82° F. |
| 60 | 7.8/7.9 @ 80° F. | 8.0/7.9 @ 82° F. | 8.0/8.3 @ 80° F. | 8.8/8.9 @ 80° F. |
| 100 | 9.6/9.6 @ 80° F. | 9.1/9.3 @ 82° F. | 8.7/8.9 @ 80° F. | 9.9/10.2 @ 79° F. |

*Before premix introduction
**Measured immediately after premix introduction

As can be seen in Table I, Working Examples 1 and 2 have a viscosity which is comparable to Comparative Examples A and B. Specifically, this data indicates that adhesive compositions (1 and 2) containing polyvinyl alcohol with an intermediate degree of hydrolysis have a viscosity stability equivalent to that of an adhesive composition (A) containing no polyvinyl alcohol whatsoever and composition (B) containing partially hydrolyzed polyvinyl alcohol. Thus, the adhesive composition of the present invention affords the practical versatility which is useful in corrugated board manufacturing allowing for what may be varying periods between initial formulation, and use in manufacture. The manufacture of corrugated board does not allow for adhesives which may set up or gel prematurely prior to their application in their intended environment.

BOND SETTING SPEED

A study of the speed of set was undertaken to determine the difference between Working Examples 1 ad 2 and Comparative Examples A and B. The speed of set is the time in seconds for the initial green bond to develop.

The following protocol was used to determine speed of set on Working Examples 1 and 2 and Comparative Examples A and B.

The hot plate was turned on at least 2 hours in advance to allow the temperature to stabilize. The single face board and the double back liner were cut. Each single face was 5"×6" or as close in dimension as Each double back was 13"×6" or as close in dimension as possible. The timer was set to about 5 seconds. The double back liner was placed lengthwise on the hot plate and weighted in place by two wood blocks. A 6 micron thick film of test adhesive was drawn down on glass. The single face board tips were pressed into the adhesive. As quickly as possible, the single face board was placed onto the double back on the hot plate. The weighted glass plate was immediately placed on top of the single face with the simultaneous starting of the timer. The wood blocks were removed from the edges of the double back liner as the timer approached 1 and sounded.

The glass weight is then removed from test sample while simultaneously gently and quickly pulling the single face board upward. The amount tack or green bond was then observed and recorded.

The ability of the adhesive compositions to form bonds was evaluated under two parameters. The first parameter was the rate at which the adhesive compositions bonded. As can be seen in Table II a check in the No column indicates that no bond had formed at that respective time. In contrast, a check in the Yes column indicates that a bond had formed at that time.

The second parameter under which the adhesive compositions were evaluated in Table II was the strength of the resulting bond. In this context, the resulting bonds were assigned a numerical rating indicative of strength with 4 being the strongest and 1 being the weakest.

TABLE II

| | Hot plate temp 260–265° F. | | | | | | | |
|---|---|---|---|---|---|---|---|---|
| | WORKING EXAMPLES | | | | COMPARATIVE EXAMPLES | | | |
| | 1 | | 2 | | A | | B | |
| | (0.15 wt % PVOH)* | | (0.15 wt % PVOH)* | | (0.0 wt % PVOH) | | (0.14 wt % PVOH)** | |
| Time | Yes | No | Yes | No | Yes | No | Yes | No |
| 5 sec. | — | — | — | — | X | — | — | — |
| 4 sec. | X | | X | | X | | X | |
| 3 sec. | X | | X | | | X | | X |
| 2 sec. | | X | | X | X | | | X |
| GREEN BOND STRENGTH | | | | | | | | |
| Strength | 3 | | 4 | | 1 | | 2 | |

*PVOH which has an intermediate degree of hydrolysis
**PVOH which is partially hydrolyzed Working Examples 1 and 2 each contain 0.15 wt-% active polyvinyl alcohol on the basis of the total formulation weight. Comparative Example B contains 0.14 wt-% of partially hydrolyzed active polyvinyl alcohol on the basis of total formulation weight.

As can be seen in Table II, the control, Comparative Example A, was included to provide a base line for determining bond set time. The green bond on sample A had fully formed in 5 seconds.

Regarding the rate of bond formation, Table II indicates that Working Examples 1 and 2, as well as Comparative Example B, all formed bonds after 3 seconds. This data indicates that the starch based adhesive of the present invention (Working Example 1 and 2) have a controlled viscosity increase which rivals a starch based adhesive containing a substantially equivalent amount of partially hydrolyzed polyvinyl alcohol (Comparative Example B).

Moreover, with regard to green bond strength, the data from Table II indicates that Working Examples 1 and 2, which exemplify the composition of the present invention, results in a green bond strength which is better than adhesive compositions having an equivalent concentration of partially hydrolyzed polyvinyl alcohol.

We claim:

1. A starch-based corrugating adhesive providing a controlled rate of viscosity increase and green bond formation comprising:
   (a) a major portion of water;
   (b) an effective bond-forming amount of starch;
   (c) an effective amount of caustic alkali;
   (d) an effective amount of an active boron source; and
   (e) an effective amount of solubilized polyvinyl alcohol having a degree of hydrolysis of about 92% to 98%; wherein said polyvinyl alcohol constituent imparts an increase in the rate of viscosity build up of the adhesive, the rate of viscosity increase being controlled to provide an adhesive bond on a corrugated board surface.

2. The composition of claim 1 wherein the polyvinyl alcohol composition is present at a concentration of about 0.05 to 0.6 parts by weight per each 100 parts of the adhesive composition.

3. The composition of claim 1 wherein the polyvinyl alcohol composition comprises a polyvinyl alcohol having a molecular weight ranging from about 5,000 to 130,000.

4. The composition of claim 1 wherein the polyvinyl alcohol composition has a degree of hydrolysis of about 92% to 98%.

5. The composition of claim 1 wherein the starch is present in the form of ungelatinized starch particles suspended in a carrier phase of gelatinized starch in an aqueous suspension wherein there are about 14 to 38 parts of ungelatinized starch and about 1.5 to 4.0 parts of gelatinized starch per 100 parts of aqueous adhesive composition.

6. The composition of claim 1 wherein the pH of the aqueous adhesive composition is between 9 and 13.

7. The composition of claim 1 wherein the pH of the aqueous adhesive composition is between 11 and 12.

8. The composition of claim 1 wherein the alkaline metal hydroxide is sodium hydroxide which is present at a concentration of about 0.02 to 0.75 parts of sodium hydroxide per 100 parts of aqueous adhesive composition.

9. The composition of claim 1 wherein the boric acid compound is $H_3BO_3 \cdot XH_2O$ or $Na_2B_4O_7 \cdot XH_2O$, wherein X is a number from 3 to 12, and is present in the aqueous adhesive composition at a concentration of about 15 to about 20 parts by weight per each 100 parts of the composition.

10. A starch-based corrugating adhesive providing a controlled rate of viscosity increase in green bond formation consisting essentially of:
   (a) a major portion of water;
   (b) about 15 to 40 parts of starch per 100 parts of aqueous adhesive composition;
   (c) about 0.02 to 0.75 parts of alkali base per 100 parts of adhesive composition;
   (d) about 15 to 20 parts of boric acid compound per 100 parts of adhesive; and
   (e) about 0.05 to 0.6 parts of solubilized polyvinyl alcohol having a degree of hydrolysis of about 92% to 98% per 100 parts of adhesive.

11. A concentrate composition, that can be combined with an aqueous starch-based adhesive composition useful in corrugating adhesives to form an adhesive, the concentrate comprising:
   (a) a major portion of water;
   (b) an effective amount of solubilized polyvinyl alcohol having a degree of hydrolysis of about 92% to 98%; and
   (c) an effective amount of defoamer, wherein upon dilution and combination with a starch-based adhesive, said polyvinyl alcohol constituent imparts a definite increase in the rate of viscosity building of the adhesive, the rate of viscosity increase being controlled to provide an adhesive bond on a corrugated board surface.

12. The concentrate composition of claim 11 wherein the polyvinyl alcohol is present in a concentration ranging from about 2 parts to 15 parts per 100 parts of concentrate.

13. The composition of claim 11 wherein the defoamer is present in a concentration ranging from about 0.05 parts to 2 parts per 100 parts of the concentrate composition.

14. The concentrate composition of claim 11 additionally comprising a filler present in a concentration ranging from about 0 parts to 10 parts per 100 parts of concentrate composition.

15. The concentrate composition of claim 14 wherein the filler is selected from the group consisting of urea and corn syrup.

16. A concentrate composition, that can be combined with an aqueous starch-based adhesive composition useful in corrugating adhesives to form an adhesive, the concentrate consisting essentially of:
  (a) a major portion of water;
  (b) an amount of solubilized polyvinyl alcohol having a molecular weight ranging from about 20,000 to 100,000 having a degree of hydrolysis of about 92% to 98% ranging from about 2 parts to 30 parts per 100 parts of concentrate composition;
  (c) an amount of defoamer ranging from about 0.05 parts to 2.0 parts per 100 parts of concentrate composition; and
  (d) an amount of filler constituent ranging from 0 parts to 10 parts per 100 parts of concentrate composition, wherein upon dilution and combination with a starch-based adhesive, said polyvinyl alcohol constituent imparts a definite increase in the rate of viscosity building of the adhesive, the rate of viscosity increase being controlled to provide an adhesive bond on a corrugated board surface.

17. The composition of claim 11 wherein the polyvinyl alcohol has a molecular weight ranging from about 5,000 to about 130,000.

18. The composition of claim 11 wherein the degree of hydrolysis of the polyvinyl alcohol ranges from about 92% to 98%.

19. The composition of claim 11 additionally comprising an effective amount of wetting agent.

20. The composition of claim 11 additionally comprising an effective amount of cross-linking agents.

21. An adhesive comprising a major proportion of water, an effective bond forming amount of the concentrate of claim 11, an effective amount of starch, an effective amount of alkali metal hydroxide to provide an alkaline pH, and an effective bond forming amount of boric acid compound.

22. A method of making a corrugated board comprising joining a corrugating medium to at least one liner using the adhesive of claim 1.

23. A method of making a corrugated board comprising joining a corrugated medium to at least one liner using the adhesive of claim 20.

24. The product of the method of claim 21.

25. The product of the method of claim 22.

* * * * *